United States Patent Office 3,526,301
Patented Sept. 1, 1970

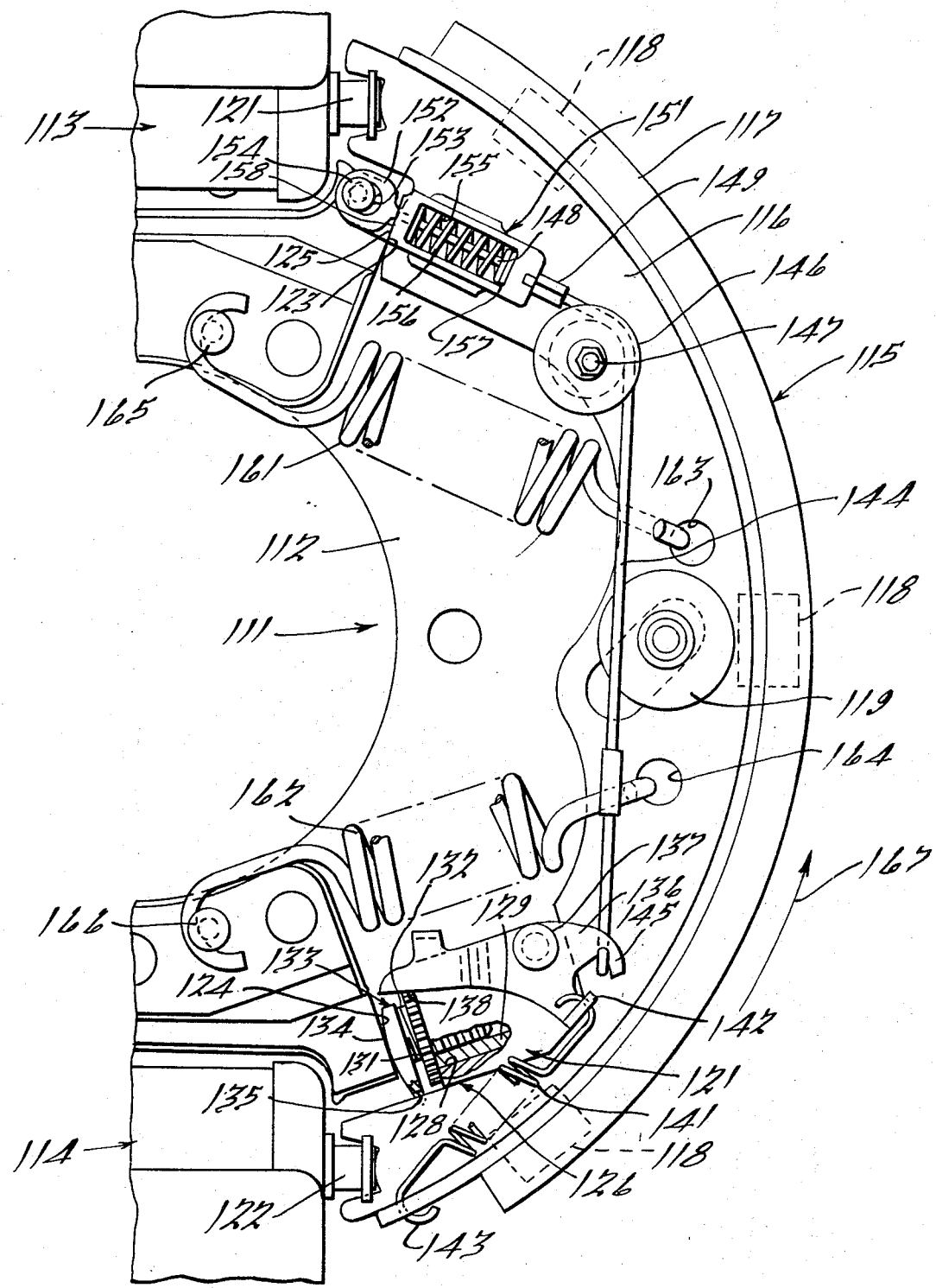

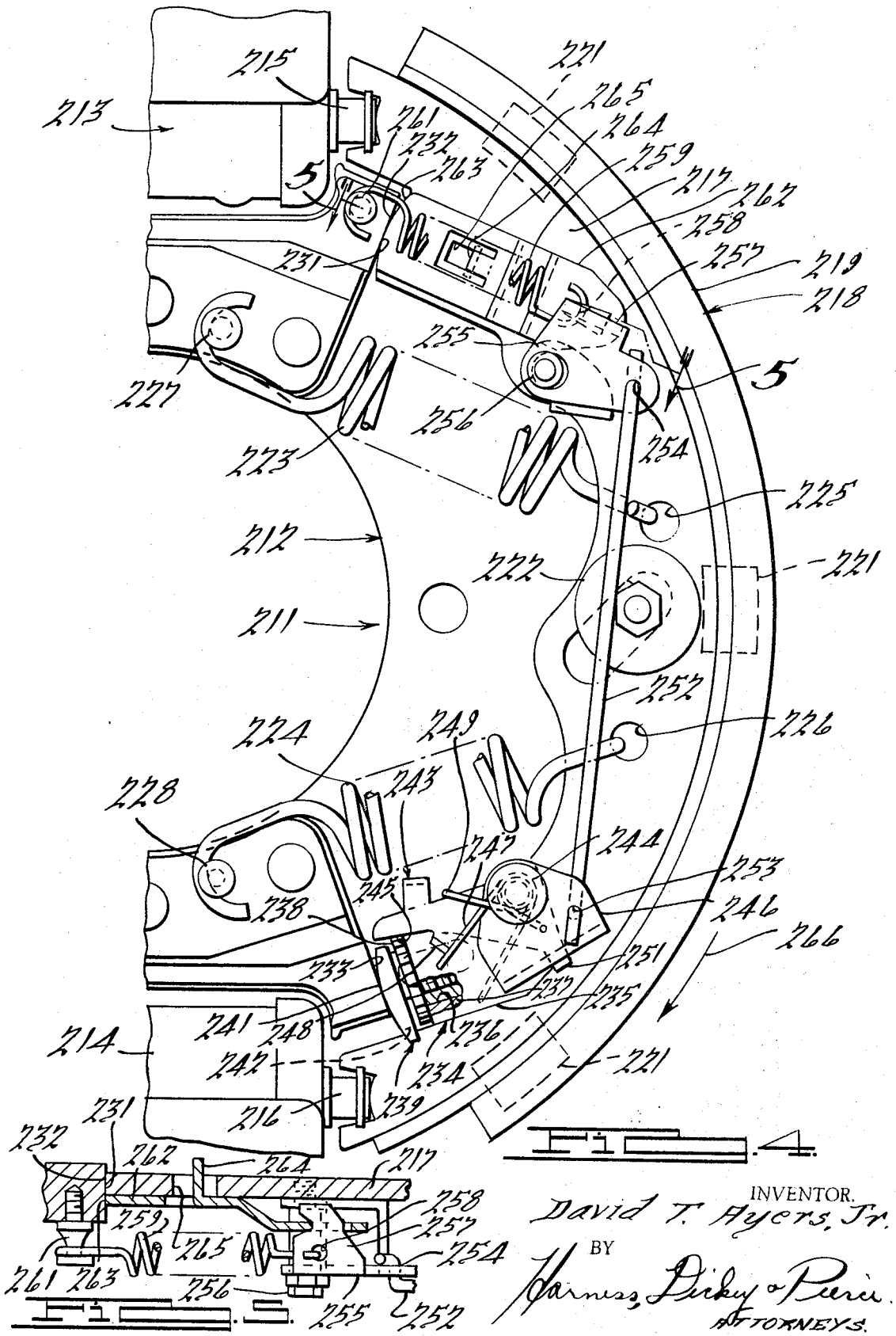

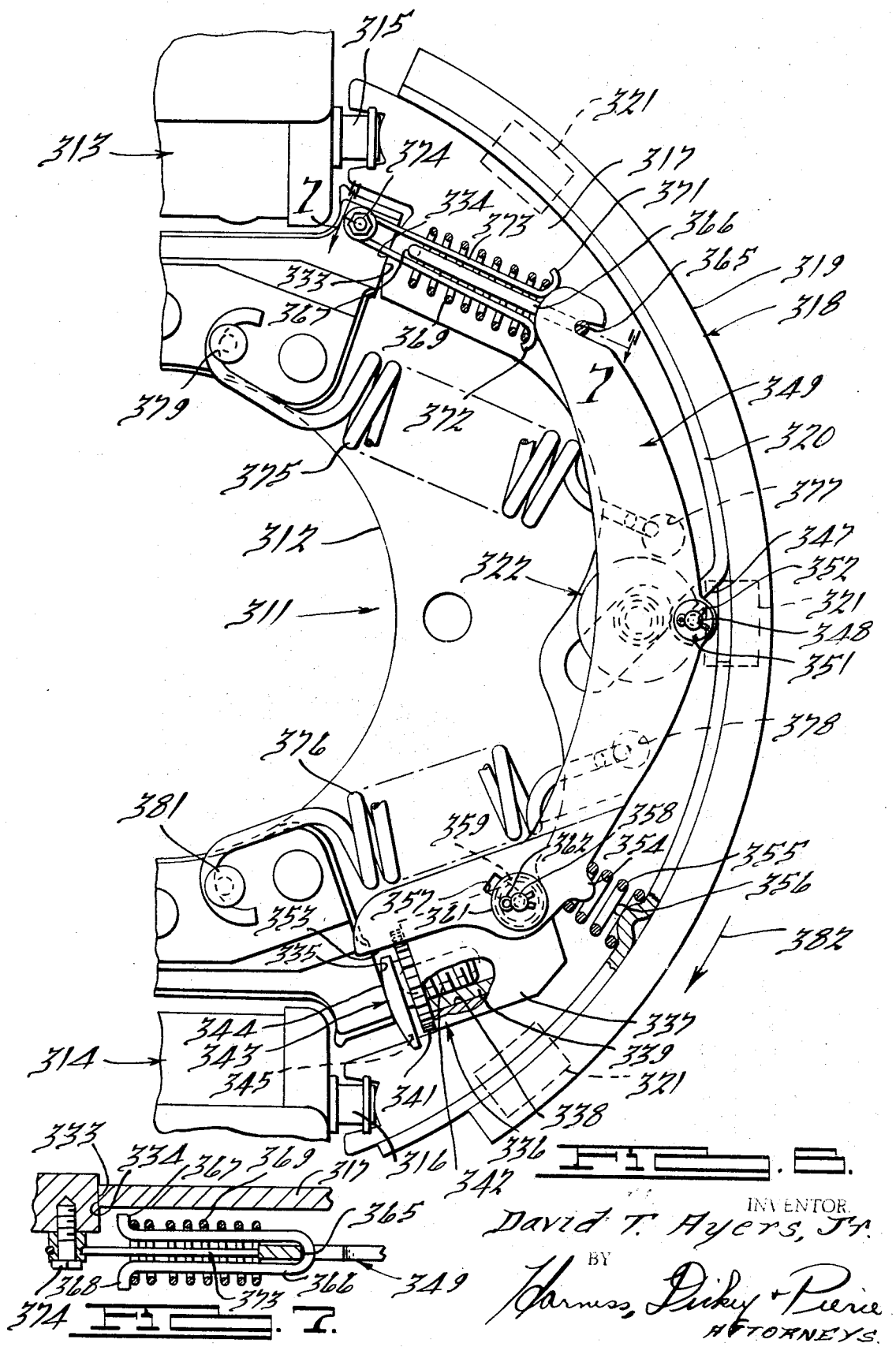

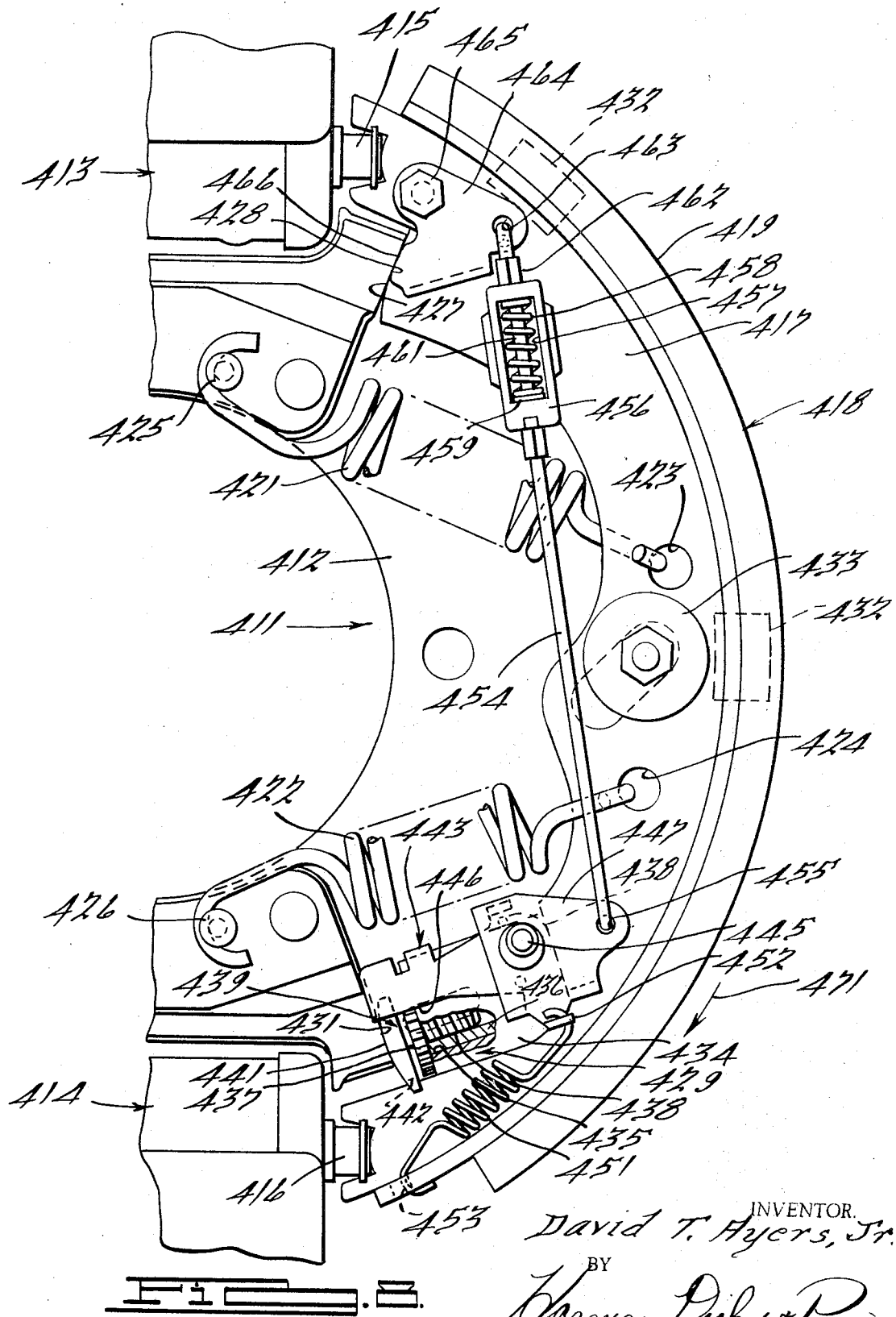

3,526,301
DRUM BRAKE WITH AUTOMATIC ADJUSTER
David T. Ayers, Jr., Birmingham, Mich., assignor to Kelsey-Hayes Company, a corporation of Delaware
Filed Mar. 13, 1968, Ser. No. 712,847
Int. Cl. F16d 51/52, 65/56
U.S. Cl. 188—79.5               18 Claims

ABSTRACT OF THE DISCLOSURE

Several embodiments of two leading shoe, two trailing shoe type internal shoe brakes embodying automatic adjusting mechanisms that are carried by the respective brake shoes. In each embodiment, the automatic adjusting device includes an extensible member carried at one end of the web of the respective brake shoe and means responsive to relative movement between the other end of the web and a fixed abutment member carried by the backing plate for adjusting the extensible mechanism.

BACKGROUND OF THE INVENTION

This invention relates to drum type brakes with automatic adjusters and more particularly to several improved embodiments of such brakes.

As is well known, the frictional lining material of the brake shoes of an automotive drum type brake wear during use and cause increased pedal movement as they become worn. It has heretofore been proposed to incorporate some form of automatic adjusting device for maintaining a fixed clearance between the lining and associated drum as the lining becomes worn. Such automatic adjusting devices have heretofore generally been made up of a number of components that are supported within the brake drum relatively independently of the brake shoes.

It is, therefore, a principal object of this invention to provide an automatic adjusting device for a shoe type brake that is supported substantially by the brake shoe.

It is another object of this invention to provide an improved automatic adjusting device for a drum type brake.

SUMMARY OF THE INVENTION

This invention is particularly adapted for embodiment in an internal shoe brake that includes a brake shoe having a web, a frictional lining carried by the web and a wheel cylinder juxtaposed to one end of the web for moving the frictional lining into engagement with an associated brake drum. The brake also includes a backing plate carrying first and second abutment members juxtaposed to opposite ends of the web. One end of the web is adapted to engage one of the abutment members and an automatically adjustable extensible means is carried by the other end of the web. The extensible means includes a rotatable member adapted to increase the length of the extensible means upon rotation of the rotatable member and a stop member having an abutment surface adapted to abuttingly engage the other backing plate abutment member. An adjusting member is supported for pivotal movement relative to the web and has an end portion adapted to engage the rotatable member to rotate the member and lengthen the extensible means upon pivotal movement of the adjusting member. Means responsive to a predetermined degree of movement of the other end of the web relative to the respective abutment member pivots the adjusting lever.

BRIEF DESCRIPTION OF THE DRAWINGS

FIG. 3 is a side elevational view, in part similar to FIG. 1, with portions broken away of a second embodiment of the invention.

FIG. 4 is a side elevational view, in part similar to FIGS. 1 and 3, with portions broken away, of a third embodiment of this invention.

FIG. 5 is a cross-sectional view taken along the line 5—5 of FIG. 4.

FIG. 6 is a side elevational view, in part similar to FIGS. 1, 3 and 4, with portions broken away, showing a fourth embodiment of this invention.

FIG. 7 is a cross-sectional veiw taken along the line 7—7 of FIG. 6.

FIG. 8 is a side elevational view, in part similar to FIGS. 1, 3, 4 and 6, with portions broken away, of a fifth embodiment of this invention.

DETAILED DESCRIPTION OF THE PREFERRED EMBODIMENTS

Figures 1, 2:
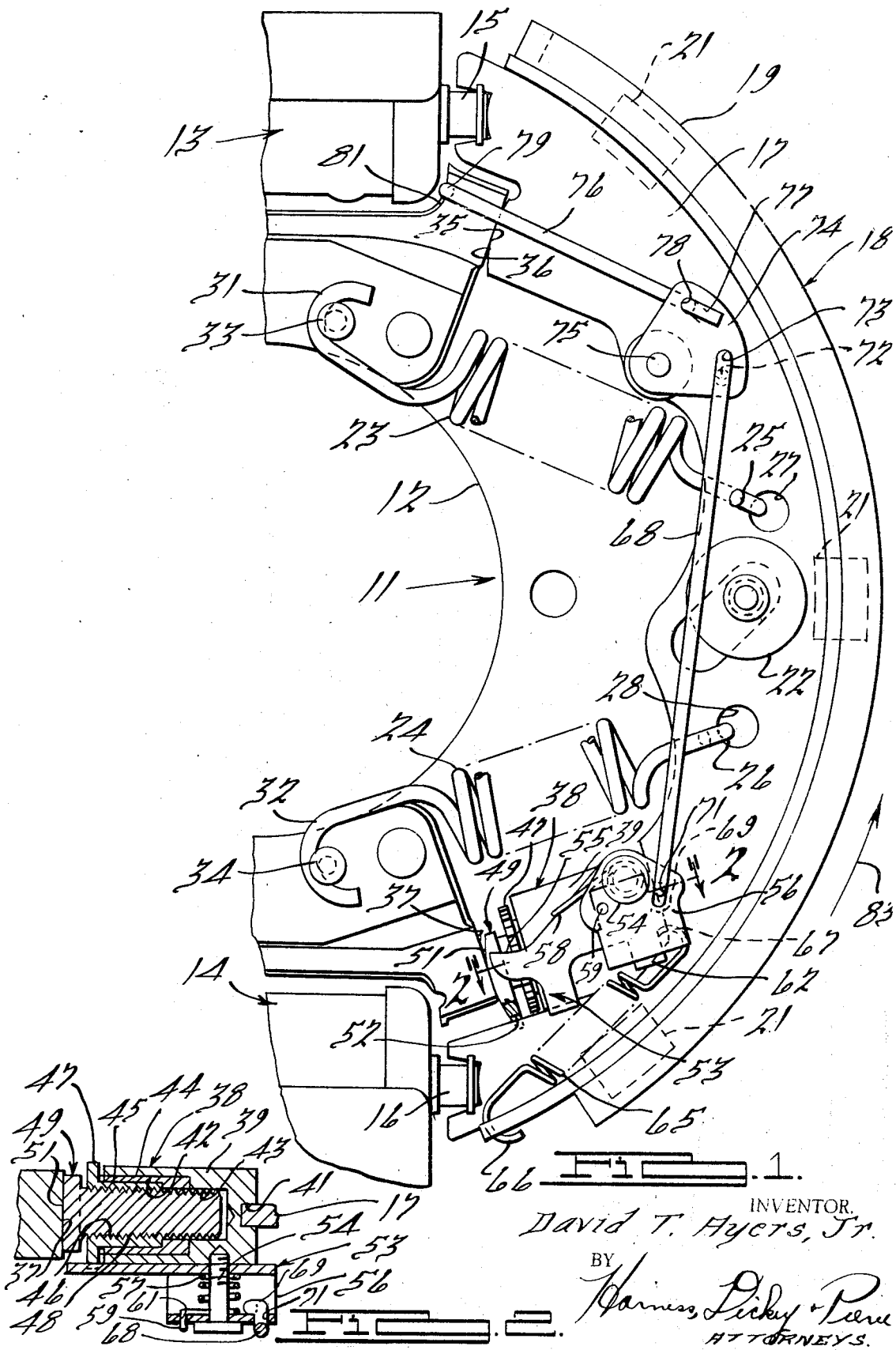
FIG. 1 is a side elevational view of a portion of a drum type brake, with the drum removed, illustrating a first embodiment of the invention.
FIG. 2 is an enlarged cross-sectional view taken along the line 2—2 in FIG. 1.

Each embodiment disclosed herein is described in conjunction with an automotive internal shoe brake of the two leading, two trailing shoe type wherein these embodiments have particular advantage. It is to be understood, however, that certain of the inventive features disclosed herein are susceptible of use in other types of brakes. In addition, only one-half of the brake assembly has been illustrated in each embodiment since construction of the other half of the brake assembly is believed to be obvious. The half not illustrated is substantially the same as the half described but is inverted with respect to the described half.

Referring now first to the embodiment shown in FIGS. 1 and 2, a brake having an automatic adjusting mechanism incorporating a first embodiment of the invention is identified generally by the reference numeral 11. The brake 11 is comprised of a backing plate 12 that carries a pair of actuating wheel cylinder assemblies 13 and 14 in a known manner. The wheel cylinder assemblies 13 and 14 include piston rods or plungers 15 and 16, respectively, that are engaged with opposite ends of a web 17 of a brake shoe 18 for bringing a frictional lining 19 of the brake shoe 18 into engagement with a drum (not shown). The backing plate 12 is formed with lugs or embossments 21 against which the brake shoe 18 is held by a hold down spring assembly 22 in a known manner so that the brake shoe 18 is supported for sliding movement relative to the backing plate 12. Return springs 23 and 24 have first end portions 25 and 26 that are received in respective apertures 27 and 28 formed in the web 17. The oppostie end portions 31 and 32 of the return springs 23 and 24 are received around pins 33 and 34 affixed to the backing plate 12 for exerting a retractive force upon the brake shoe 18.

The backing plate 12 is provided with a fixed abutment surface 35 adjacent the wheel cylinder 13 and against which an adjacent surface 36 of the web 17 is engaged when the brake shoe 18 is in its retracted position. A like abutment surface 37 is juxtaposed to the opposite end of the web 17 adjacent the wheel cylinder 14. The surface 37 is adapted to be abuttingly engaged by an automatically adjusted extensible mechanism 38 carried by the adjacent portion of the web 17, as will become more apparent as this description proceeds.

The extensible mechanism 38 is comprised of a generally cylindrical block 39 having a groove 41 formed at one of its ends. The adjacent end of the web 17 of the brake shoe 18 is received in the groove 41 and the block 39 is affixed to the web 17, as by welding, in this area. The block 39 is formed with a counterbored opening comprised of a larger diameter portion 42 formed at its outer end and a smaller diameter portion 43 formed at the inner end. An antifriction sleeve 44 is received in the bore portion 42 and in turn, rotatably supports a sleeve 45 having internal threads 46. The outer end of the sleeve 45 is formed with a star wheel portion 47. A threaded shank 48 of a stop member 49 is received in the threads 46 of the sleeve 45 and extends in part into the bore portion 43. The outer end of the stop member 49 provides an abutment surface 51 that is adapted to abuttingly engage the abutment surface 37 of the backing plate 12. In addition, the stop member 49 is slotted, as at 52 to receive a portion of the web 17 and to hold the stop member 49 against rotation.

An adjusting lever, indicated generally by the reference numeral 53, is pivotally supported upon the block 39 by means of a pivot pin 54. The adjusting lever 53 has an outwardly extending cam portion 55 that is adapted to engage the star wheel 47 for rotating the sleeve 45, in a manner that will become more apparent as this description proceeds. An operating lever 56 is also pivotally supported upon a pivot pin 54. A coil compression spring 47 is received around the pivot pin 54 and engages the actuating lever 56 and the adjusting lever 53. One end 58 of the spring 57 engages the lever 53 and the other end is fixed to the lever 56, as by means of an end portion 59 that extends through a circular aperture 61 formed in the lever 56. The lever 53 also has an outwardly extending tang 62 that engages the lever 56 so that rotation of the lever 56 in a clockwise direction, as viewed in FIG. 1, will provide for simultaneous rotation of the adjusting lever 53. Upon counterclockwise rotation of the lever 56, the spring 57 will provide for counterclockwise rotation of the adjusting lever 53. An adjusting spring 65 has one of its ends 66 affixed to the brake shoe 18. An opposite end 67 of the adjusting spring 65 is engaged with the lever 56 so that the spring 65 normally exerts a bias upon the lever 56 tending to rotate it in a clockwise direction.

A link 68 has an inturned end portion 69 that is received in an elongated slot 71 formed in the lever 56 to pivotally connect this end of the link 68 to the lever 56 and to provide for some lost motion between the link 68 and the lever 56. The opposite end of the link 68 is offset, as at 72 and is received in a circular aperture 73 in an intermediate bellcrank 74 to pivotally connect the link 68 to the bellcrank 74. The bellcrank 74 is supported for pivotal movement upon the brake shoe web 17 by means of a pivot pin 75. A second link 76 has an end portion 77 that is received in an aperture 78 in the bellcrank 74 to pivotally connect the second link 76 to the bellcrank 74. A reversely bent end portion 79 formed at the opposite end of the second link 76 is received around an outwardly extending projection 81 of the backing plate formed adjacent the abutment surface 35.

As has been previously noted, only one-half of the brake 11 has been illustrated and described. It is to be understood that the opposite side of the brake is substantially the same as that shown and described in that it includes a brake shoe that is actuated by the wheel cylinders 13 and 14 and an automatic adjusting mechanism. The automatic adjusting mechanism for the other brake shoe is, however, inverted with respect to the automatic adjusting mechanism that has been illustrated for a reason which should be apparent as the description of the operation proceeds.

In operation, it is assumed that the drum associated with the brake is rotating in a direction indicated generally by the arrow 83, that is, in a counterclockwise direction. This direction of drum rotation is considered to be the forward direction of the drum when the brake 11 is associated with a wheel of a vehicle. When it is desired to actuate brake 11, the wheel cylinders 13 and 14 are pressurized in any known manner causing the plungers 15 and 16 to move outwardly. This outward movement is directly transmitted to the brake shoe 18 to urge its lining 19 into engagement with the drum. When the shoe 18 and particularly its lining 19 engages the drum, the shoe 18 will tend to rotate in the direction of the arrow 83. This action will cause the plunger 15 to be driven back into the wheel cylinder 13 until the web abutment surface 36 engages the abutment surface 35 of the backing plate 12. Continued rotation of the shoe 18 will then be precluded. During this action, the automatically adjusted extensible mechanism 38 will perform its adjustment if a predetermined degree of lining wear has occurred, in a manner which will become more apparent as the description proceeds. At this time, the abutment surface 51 of the stop member 49 will be displaced outwardly of the backing plate abutment surface 37. Upon release of the brakes, that is, upon cessation of the application of hydraulic force to the wheel cylinders 13 and 14, the retraction springs 23 and 24 will return the brake shoe 18 to its at rest position, as shown in FIG. 1.

Considering now that the drum is rotating in a reverse direction, that is opposite to the direction indicated by the arrow 83, when the brake 11 is engaged, the wheel cylinders 13 and 14 drive the plunger rods 15 and 16 outwardly and bring the brake shoe 18 into engagement with the drum. In this case, the brake shoe 18 will tend to rotate in a clockwise direction bringing the abutment surface 51 of the automatically adjusted extensible device 38 into engagement with the abutment surface 37 of the backing plate. The abutment surface 36 of the web 17 will, however, move away from the corresponding abutment surface 35 of the backing plate 12 in an amount dependent upon the degree of wear of the brake lining 19. Since the end 79 of the link 76 is fixed relative to the backing plate surface 81, a force will be exerted upon the bellcrank 74 through the link 76. The bellcrank 74 will then pivot in a counterclockwise direction in an amount dependent upon the degree of tension on the link 68 is transmitted to the actuating lining wear 19 and evert a tension upon the link 68. This tension on the link 68 is transmitted to the actuating lever 56 causing it to be rotated in a counterclockwise direction about the pivot pin 54. At the same time, a further tension is put on the adjusting spring 65. The counterclockwise rotation of the actuating lever 56 is alsos transmitted into counterclockwise rotation of the adjusting lever 53 through the spring 57 and due to the contact of the tang 62 with the lever 56. If sufficient lining wear has taken place, the cam end 55 of the adjusting lever 53 will be moved sufficiently to index with the next tooth on the star wheel 47. During this movement, the spring 57 compresses in an axial direction to permit the adjusting lever 53 to move axially slightly relative to the pivot pin 54 to accommodate its movement relative to the arcuate shape of the star wheel 47.

Upon release of the brake shoe 18, the return springs 23 and 24 will retract the shoe 18 so that the abutment surface 37 of the web 17 again engages the abutment surface 35 of the backing plate. At this time, the springs 23 and 24 exert sufficient axial force upon the threads 48 and 46 through the stop member 49 to preclude rotation of the adjusting lever 53 under the force of the adjusting spring 65.

Upon the next succeeding application of the brake shoe 18 when the drum is rotating in a forward direction as indicated by the arrow 83, the stop member 49 will again move away from the abutment surface 37 in the manner described above. At this time, the retraction springs 23 and 24 will exert no force upon the stop member 49 and the only force tending to prevent rotation of the star wheel 47 will be the frictional force of the threads 46 and 48, The adjustment spring 65 is designed, however, to have sufficient force to overcome this frictional force. The spring 65 will then rotate the actuating lever 56 in a clockwise direction and the adjusting lever 53 will also be rotated in the clockwise direction. The star wheel 47 will then be rotated causing the threaded sleeve 45 to advance the stop member 49 to the left and effect adjustment of the retracted position of the brake shoe 18 to compensate for wear of the lining 19. Thus, in this embodiment the adjusting lever 53 cocks upon reverse application of the brake shoe 18 if sufficient lining wear has taken place to require adjustment and effects adjustment upon the next succeeding actuation of the brake shoe 18 when the drum is turning in the forward direction.

Referring now to FIG. 3, an internal shoe brake having an automatic adjusting mechanism incorporating a second embodiment of this invention is identified generally by the reference numeral 111. In this embodiment, the brake 111 is comprised of a backing plate 112 that supports wheel cylinder assemblies 113 and 114, respectively. A brake shoe, indicated generally by the reference numeral 115, that is comprised of a web 116 and rim which carries a frictional lining 117 is supported adjacent the backing plate 112. The backing plate 112 is formed with bosses or embossments 118 against which the brake shoe 115 is held by a hold down spring assembly 119 in a known manner, so that the brake shoe 115 is supported for sliding movement relative to backing plate 112.

The wheel cylinder 113 has a plunger or piston rod 121 that is engaged with one end of the web 116; and the wheel cylinder 114 has a plunger or piston rod 122 that is engaged with the opposite end of the web 116. An abutment member defining an abutment surface 123 is supported by the backing plate 112 adjacent the wheel cylinder 113. A like abutment member defining an abutment surface 124 is carried by the backing plate 112 adjacent the wheel cylinder 114. The web 116 defines an abutment surface 125 that is adapted to engage the abutment surface 123 when the shoe 115 is in its retractive position. An automatically adjusted extensible member, indicated generally by the reference numeral 126, is carried by the web 116 adjacent the abutment surface 124 for adjusting the retracted position of the brake shoe 115, in a manner which will become more apparent as this description proceeds.

As in the previously described embodiment, the extensible member 126 is comprised of a block 127 that is affixed to the web 116, for example, in a manner as described in connection with the embodiment of FIGS. 1 and 2. The block 127 is formed with an internal bore 128 that supports an internally threaded sleeve 129 for rotation. The outer end of the sleeve 129 is formed with a star wheel portion 131 that is juxtaposed to one end of the block 129. A male threaded shank 132 of a stop member 133 is threaded into the sleeve 129. The stop member 133 has a head that defines an abutment surface 134 that is adapted to abuttingly engage the backing plate abutment surface 124. The stop member 133 is also formed with a slot 135 in which a portion of the web 116 is received for holding the stop member 133 against rotation relative to the web 116.

An adjusting lever 136 is pivotally supported upon the block 127 by means of a pivot pin 137. A coil compression spring (not shown), may be interposed between a head of the pivot pin 137 and the lever 136 to allow the lever 136 to move axially upon the pivot pin 137. The outer end of the adjusting lever 136 is formed with a cam surface 138 that is adapted to engage and rotate the star wheel 131 and sleeve 129 in a manner which will become more apparent as this description proceeds.

An adjusting lever return spring 141 has one of its ends affixed to an outwardly extending tang 142 formed on the adjusting lever 136. The opposite end of the return spring 141 is connected to the rim of the brake shoe 115, as at 143, to exert a force on the lever 136 tending to rotate it in a clockwise direction to a cocked position.

One end of a flexible cable 144 is affixed to an outwardly extending arm 145 of the adjusting lever 136. The cable 144 is trained around a pulley 146 that is rotatably supported upon the web 116 by means of a shaft 147. The opposite end of the cable 144 is affixed to an anchor member 151. A rod 148 is slidably supported by the anchor member 151 and has a boss 152 at its outer end in which a bore 153 is formed. The bore 153 receives a headed pin 154 fixed to the backing plate adjacent the abutment member surface 123. The anchor member 151 is formed with a central cavity 155 in which a coil compression spring 156 is received around the opposite end of the rod 148. A disk 157 is fixed to the rod 148 at one end of the cavity 155 and against which one end of the spring 156 bears. The opposite end of the spring 156 engages the anchor member 151 at the opposite end of the cavity 155. An outer end 158 of the anchor member 151 normally engages the backing plate abutment surface 123 so that the spring 156 will not cause sufficient tension to be exerted on the cable 144 to move the adjusting lever 136 when the shoe 115 is retracted.

A pair of return springs 161 and 162 have one of their ends affixed within respective apertures 163 and 164 formed in the web 116. The opposite ends of the springs 161 and 162 are connected to pins 165 and 166, respectively, fixed to the backing plate 112 adjacent the anchor members that define the abutment surfaces 123 and 124. The return springs 161 and 162 exert a force upon the brake shoe 115 that moves the shoe to its retracted position (FIG. 3).

In this embodiment, the normal or forward direction of rotation of the drum (not shown) is identified by the arrow 167. When the brake shoe 115 is actuated and the drum is rotating in the direction of the arrow 167, hydraulic fluid is applied under pressure to the wheel cylinders 113 and 114 in a known manner. The plungers 121 and 122 initially move outwardly until the lining 117 engages the drum. The brake shoe 115 will then tend to rotate with the drum in the direction of the arrow 167 until the web abutment surface 125 engages the anchor member abutment surface 123. At this time, the stop member 133 of the automatically adjusted extensible mechanism 126 will move away from its respective backing plate abutment surface 124 but no adjustment will be effected. Upon the cessation of actuation, the return springs 161 and 162 will withdraw the brake shoe 115 to its retracted position as shown in FIG. 3.

Considering now the application of the brake shoe 115 upon reverse drum rotation, the plungers 121 and 122 again force the brake shoe 115 outwardly upon actuation of the wheel cylinders 113 and 114. When the lining 117 engages the drum, the shoe 115 rotates with the drum in a direction opposite to that indicated by the arrow 167 until the abutment surface 134 of the stop member 133 engages the abutment surface 124 of the backing plate 112. At this time the web abutment surface 125 will have moved outwardly from the backing plate abutment surface 123 an amount dependent upon the degree of wear of the lining 117. Upon this relative movement, the anchor member 151 will tend to move away from the rod 148 and tend to cause compression of the spring 156 since the cable 144 is relatively inextensible. The spring 156 is preloaded to a predetermined degree, however, so as to resist this movement of the anchor member 151. As long as the preload on the spring 156 is not exceeded, the anchor member 151 will be held against movement and the cable 144 will move over the pulley 146 and exert a force on the adjusting lever 136 turning it in a counterclockwise direction. If sufficient lining wear has taken place, the lever cam portion 138 will engage the star wheel 131 and rotate it sufficiently to achieve adjustment of the stop member 133 relative to the block 127. When the load required to turn the star wheel 131 exceeds a predetermined value, the spring 156 will compress causing a discontinuance in the adjustment. Upon release of the brake shoe 115, the spring 141 will return the lever 136 to its at rest or cocked position so that it will be ready to effect the next required adjustment.

Thus, it should be apparent that this embodiment operates to adjust the retracted position of the brake shoe upon reverse application, the adjustment taking place during actual brake operation. The spring 156 will yield, however, under any malfunction to prevent damage to the components. It should also be apparent that the cable 144 and pulley 146 could be replaced by a bellcrank arrangement as in the embodiment of FIGS. 1 and 2 when used in conjunction with the protective spring 156 and the remaining associated mechanism.

Referring now in details to FIGS. 4 and 5, a brake having an automatic adjusting device incorporating another embodiment of this invention is identified generally by the reference numeral 211. In some regards the automatic adjusting device of this embodiment is similar to that of FIG. 3 with the substitution of a linkage system for the flexible cable. In this embodiment, as in the previous embodiments, the brake 211 includes a backing plate 212 that carries hydraulically operated wheel cylinder assemblies 213 and 214. The wheel cylinders 213 and 214 include hydraulically operated plunger rods 215 and 216 that coact with opposite ends of a web 217 of a brake shoe 218. The rim of the brake shoe 218 carries a frictional lining material 219 that is adapted to be brought into frictional engagement with a brake drum (not shown) upon actuation of the wheel cylinders 213, 214. The brake shoe 218 is supported for sliding movement upon a plurality of outstanding bosses 221 provided on the backing plate 212 and against which the brake shoe 218 is held by a hold down spring assembly 222 in a known manner. Retraction springs 223 and 224 are connected between holes 225 and 226 in the web 217 and fixed anchor pins 227 and 228 carried by the backing plate 211 to effect retraction of the brake shoe 212 when the wheel cylinders 213 and 214 are not energized.

Adjacent the wheel cylinder 213, the backing plate 212 is provided with abutment member that presents an abutment surface 231 to an adjacent abutment surface 232 formed at this end of the brake shoe web 217. A like abutment surface 233 is formed by an abutment member that is juxtaposed to the wheel cylinder 214. The abutment surface 233 is adapted to be abuttingly engaged by an automatically adjusted extensible mechanism, indicated generally by the reference numeral 234, which is carried by the adjacent end of the web 217.

As in each of the previously described embodiments, the automatically adjusted extensible mechanism 234 is comprised of a block 235 that is affixed in any known manner to the brake shoe web 217. The block 235 is formed with an internal bore 236 in which an internally threaded sleeve 237 is supported for rotation. The outer end of the threaded sleeve 237 is formed with an integral star wheel 238 that is juxtaposed to one end of the block 235. A stop member, indicated generally by the reference numeral 239, is formed with a threaded shank that is threaded into the sleeve 237. The stop member is formed with an abutment surface 241 that is adapted to abuttingly engage the backing plate abutment surface 233. As in the previous embodiments, the stop member 241 is formed with a slot 242 in which a portion of the web 217 is received to preclude rotation of the stop member 239.

An adjusting lever, indicated generally by the reference numeral 243 is pivotally supported upon the block 235, by means of a headed pivot pin 244. The adjusting lever 243. An operating lever 246 is also supported upon adapted to engage the star wheel 238 and to rotate the star wheel 238 upon pivotal movement of the adjusting lever 243. A noperating lever 246 is also supported upon the pivot pin 244 for pivotal movement with respect to the block 235. A coil tension spring 247 has one of its ends engaged with a tang 248 formed on the adjusting lever 243 and its opposite end 249 in engagement with the upper end of a block 235. The spring 247 normally exerts a bias on the adjusting lever 243 tending to rotate it in a clockwise direction to an at rest or cocked position. The spring 247 also may permit some axial movement of the adjusting lever 243 relative to the pivot pin 244 so that the end portion 245 may follow the configuration of the star wheel 238. A tang 251 formed on the adjusting lever 243 contacts the operating lever 246 so that the levers 243 and 246 will normally rotate in unison.

One end of a link 252 is pivotally connected to the actuating lever 246, as at 253. The opposite end of the link 252 is pivotally connected, as at 254, to one arm of a bellcrank 255 that is pivotally supported upon the web 217 by means of a pivot pin 256. Another arm of the bellcrank 255 is formed with an inwardly extending portion or tang 257 in which an aperture 258 is formed. One end of a coil tension spring 259 is received in the opening 258. The opposite end of the spring 259 is connected to a pin 261 that is affixed to the backing plate adjacent its abutment surface 231.

The tang 257 of the bellcrank 255 also is engaged in an aperture in the outer end of a sliding plate 262 that is juxtaposed to the brake shoe web 217. The sliding plate 262 has an arcuate surface 263 that is adapted to abuttingly engage the abutment surface 231 and is constrained for sliding movement relative to the web 217 by means of an offset T-shaped portion 264 that is received in an elongated slot 265 formed in the web 217.

As in the embodiment of FIG. 3, this embodiment effects automatic adjustment of the brake shoe 218 upon actuation of the brake shoe when the associated drum is rotating in a reverse direction, as indicated by the arrow 266. The operation of the brake during forward rotation will not be described since it is substantially the same as that of the embodiment of FIG. 3. When the drum is rotating in the direction of the arrow 266 (reverse rotation) and the wheel cylinders 213, 214 are hydraulically actuated, the plungers 215 and 216 will force the brake shoe 218 radially outwardly. When the brake lining 219 engages the rotating drum, the brake shoe 218 will tend to rotate with the drum in the direction of the arrow 266 until the stop member surface 241 engages the backing plate abutment surface 233. At this time, the abutment surface 232 at the opposite end of the web 217 will move away from the backing plate abutment surface 231 an amount dependent upon the degree of wear of the lining 219. During this relative movement, the spring 259 is tensioned and creates a force on the bellcrank 255 tending to rotate it in a counterclockwise direction about the pivot pin 256. The spring 259 is sufficiently strong to effect such movement of the bellcrank 255, unless there is some malfunction in the remainder of the adjusting mechanism. Rotation of the bellcrank 255 slides the plate 262 to the left so that its surface 263 is maintained in engagement with the abutment surface 231. The clockwise rotation of the bellcrank 255 is also transmitted to the link 252 to effect counterclockwise rotation of the operating lever 246 and the adjusting member 243. If sufficient lining wear has taken place, the adjusting lever 243 will rotate the star wheel 238 and effect adjustment of the extensible mechanism 234. If the friction torque resistance to the rotation of the star wheel 238 exceeds the preload on the spring 259, the spring 259 will yield so that the components will not be damaged.

After release of the brake shoe 218, the spring 247 will again return the adjusting lever 243 to its retracted or cocked position, where it is ready for its next adjustment. In the retracted position, the preload on the spring 259 cannot effect any pivotal movement on the bellcrank 255 because of the engagement of the bellcrank arm 257 with the plate 262 and this plate's engagement with the abutment surface 231.

The embodiment shown in FIGS. 6 and 7 is similar in some respects to the embodiments of FIGS. 3 through 5 in that the automatic adjusting mechanism of this embodiment affects adjustment upon application of the brakes when the drum is moving in a reverse direction. Referring now specifically to FIGS. 6 and 7, a brake assembly having an automatic adjusting mechanism incorporating a further embodiment of the invention is identified generally by the reference numeral 311. The brake assembly 311 includes a backing plate 312 that carries wheel cylinder assemblies 313 and 314. The wheel cylinder assemblies 313 and 314 have hydraulically operated piston rods or plungers 315 and 316, respectively, that engage opposite ends of a web 317 of a brake shoe, indicated generally by the reference numeral 318. Upon actuation of the wheel cylinders 313 and 314, the plungers 315 and 316 bring a frictional lining 319 carried by the rim 320 of the brake shoe 318 into engagement with an associated drum (not shown). The backing plate 312 is formed with bosses 321 against which the brake shoe 318 is held by a hold down spring assembly indicated generally by the reference numeral 322 for support of the brake shoe 318 for sliding movement in a radial direction with respect to the backing plate 312.

An abutment member defining an abutment surface 333 is affixed to the backing plate 312 adjacent to the wheel cylinder 313. The adjacent end of the web 317 is formed with an abutment surface 334 that is adapted to engage the abutment member surface 333. An abutment member presenting an abutment surface 335 is also fixed to the backing plate 312 adjacent the wheel cylinder 314. The abutment member surface 335 is adapted to be engaged by an automatically adjusted extensible mechanism, indicated generally by the reference numeral 336 that is carried at the opposite end of the web 317.

As in the previously described embodiments, the extensible mechanism 336 is comprised of a block 337 that is rigidly affixed to the web 317, as by welding. The block 337 is formed with a bore 338 in which an internally threaded sleeve 339 is rotatably supported. The threaded sleeve 339 is formed with a star wheel portion 341 at its outer end, which is juxtaposed to one end of the block 337. A male threaded shank 342 of a stop member, indicated generally by the reference numeral 343, is threaded into the sleeve 339. The stop member 334 presents an abutment surface 344 that is adapted to engage the backing plate abutment surface 335 and is further formed with a slot 345 that receives a portion of the web 317 to hold the stop member 343 against rotation.

The rim 320 of the brake shoe 318 is formed with an inwardly struck portion 347 that forms a socket for pivotally receiving a pivot pin 348. The 348 is affixed to an adjusting lever, indicated generally by the reference numeral 349 as by a washer 351 and cotter key 352 to pivotally support the adjusting lever 349 upon the brake shoe 318. The adjusting lever 349 has a first end portion 353 that is juxtaposed to the star wheel 341 and which is adapted to rotate the star wheel upon pivotal movement of the adjusting lever 349, as will become more apparent as this description proceeds. Adjacent the extensible member 346, the adjusting lever 349 is formed with a boss or extension 354 around which an end of a conical coil spring 355 is received. The opposite end of the spring 355 is received around an embossment 356 formed on the brake shoe rim 320 to locate the spring 355. The spring 355 exerts a force on the adjusting lever 349 tending it to rotate it in a clockwise direction about the pivot pin 348 to return the adjusting lever 349 to its released or cocked position.

The adjusting lever 349 is also formed with a slot 357 adjacent the block 337 through which a pin 358 extends. The pin 358 is affixed to the block 337 and a hold down spring 359 is interposed between a washer 361, that is affixed to the outer end of the pivot pin 358 by means of a cotter key 362, and the adjusting lever 349. The spring 359 holds the adjusting lever 349 adjacent to the block 357 but permits some movement of the adjusting lever in a direction along the axis of the pin 358 so that the adjusting lever end portion 353 may follow the star wheel 341 as it is rotated. The support of the pivot pin 348 in the rim socket 347 also permits this movement.

Considering now the opposite end of the adjusting lever 349, it is formed with a recess or notch 365 in which the bight of a U-shaped rod member 36 is received. The U-shaped rod member 366 has outwardly extending legs 367 and 368 that bear against one end of a coil compression spring 369, which encircles in part the member 366. The opposite end of the spring 369 engages reversally bent portions 371 and 372 of a second U-shaped member 373 that is also partially encircled by the spring 362. The bight of the second U-shaped member 373 is received around a pin 374 that is fixed to the backing plate 312 adjacent the abutment member surface 333. The spring 369 is, therefore, trapped between the U-shaped members 366 and 373.

Return springs 375 and 376 have one of their ends fixed within respective apertures 377 and 378 formed in the brake shoe web 317. The opposite ends of the return springs 375 and 376 engage pins 379 and 381 that are fixed to the backing plate 312 to cause retraction of the brake shoe 318. In its retracted position (FIG. 6) the web abutment surface 334 engages the backing plate abutment surface 333 and the stop member abutment surface 344 engages the abutment surface 335 of the backing plate 312.

In operation, the adjusting device of the brake 316 operates upon reverse application of the brakes, as in the embodiments of FIGS. 3 through 5. For this reason, the operation of the brake when the associated brake drum is rotating in a forward direction will not be described. Considering, however, that the associated drum is rotating in a reverse direction, as indicated by the direction of the arrow 382, the brake shoe 318 will move radially outwardly when the wheel cylinders 313 and 314 are energized. Upon contact of the lining 319 with the drum, the brake shoe 318 will rotate in the direction of the arrow 382. This rotation continues until the stop member abutment surface 344 engages the backing plate abutment surface 335. At this time the web abutment surface 334 at the opposite end of the brake shoe will move away from the backing plate abutment surface 333 an amount that is dependent upon the degree of wear of the lining 319. If sufficient wear has taken place, adjustment will be effected in the manner now described.

When the web abutment surface 334 moves away from the backing plate abutment surface 333 a force will be exerted upon the adjusting lever 349 through the U-shaped member 373, spring 369 and U-shaped member 366 tending to rotate the lever 349 in a counterclockwise direction. The adjustment lever 349 will then rotate about the pivot pin 348 and its end 353 will contact and rotate the star wheel 341 to achieve adjustment. In the event friction of the threaded connection between the stop member 343 and the internally threaded sleeve 339 exceeds the preload in the spring 369, the spring 369 will yield to preclude further pivotal movement of the adjsuting lever 349 and damage to the components. Once the adjustment has been made and upon release of the brake shoe 318, the spring 355 will move the adjusting lever 349 back to its cocked position when the retraction springs 375 and 376 retract the brake shoe 318. Since the end of the adjusting lever 349 contacts the ends 371 and 372 of the member 373, the spring 369 cannot cause pivoted movement of the lever 349 when the shoe 318 is retracted. In some instances it may be desirable to provide for adjustment of the preload upon the spring 369 and to take up clearances resulting from manufacturing tolerances. Such adjustment may be effected by making the pin 374 eccentric so that it may be rotated about an axis to make such adjustments.

Referring now to the embodiment in FIG. 8, this embodiment operates similar to that of the embodiment of FIGS. 1 and 2. That is, the automatic adjusting mechanism cocks upon reverse application of the brakes and effects adjustment either upon the release of the brakes or upon the next succeeding actuation of the brakes in the forward direction.

Considering this embodiment now in detail, a brake having an automatic adjusting device incorporating a further embodiment of this invention is identified generally by the reference numeral 411. The brake 411 is comprised of a backing plate 412 that supports wheel cylinder assemblies 413 and 414. The wheel cylinder assemblies 413 and 414 have respective piston rods or plungers 415 and 416 that engage opposite ends of a web 417 of a brake shoe, indicated generally by the reference numeral 418. Upon actuation of the wheel cylinders 413 and 414, a frictional lining 419 of the brake shoe 418 is brought into engagement with a drum (not shown). The brake shoe 418 is held in its retracted position by means of a pair of return springs 421 and 422 that have first end portions that are received in respective apertures 423 and 424 formed in the brake shoe web 417. The opposite ends of the return springs 421 and 422 are received around pins 425 and 426 affixed to the backing plate 412. In its released position, an abutment surface 427 formed at one end of the web 417 engages an abutment surface 428 formed on an abutment member carried by the backing plate 412. At the opposite end of the web 417, an automatically adjusted extensible member, indicated generally by the reference numeral 429, is brought into engageemnt with an abutment surface 431 carried by an abutment member that is fixed to the backing plate 412. As in the previously described embodiments, the backing plate 412 is formed with bosses 432 against which the rim of the brake shoe 418 is held by a hold down spring assembly 433 so that the brake shoe 418 is supported for its sliding movement relative to the backing plate 412.

The automatically adjusted extensible mechanism 429, as in each relative embodiment, is comprised of a block 434 that is affixed to the adjacent end of the web 417 in any known manner. The block 434 is formed with a bore 435 in which an internally threaded sleeve 436 is supported for rotation. The sleeve 436 is formed with a star wheel 437 at its outer end, which star wheel is adjacent to one end of the block 434. A male threaded shank 438 of a stop member, indicated generally by the reference numeral 439, is received in the threaded sleeve 436. The stop member 439 provides an abutment surface 441 that is adapted to engage the abutment surface 431 of the backing plate 412. The stop member 439 is also formed with a slot 441 that receives a portion of the brake shoe web 417 to hold the stop member 439 against rotation.

An adjusting lever, indicated generally by the reference numeral 443 supported for pivotal movement upon the block 434, as by a headed pivot pin 445. The adjusting lever 434 has an end portion 446 that is adapted to engage the star wheel 437 and rotate the star wheel, as will become more apparent as this description proceeds. An operating lever 447 is also supported for pivotal movement upon the pivot pin 435. A torsional spring 438 is interposed between the operating lever 437 and the adjusting lever 438 so that these levers normally rotate in unison and for permitting the adjusting lever 434 to move axially upon the pivot pin 445 so that its end portion 446 may follow the star wheel 437.

An adjusting spring 451 has one of its ends affixed to a tang 452 of the operating lever 447 and its opposite end affixed to the rim of the brake shoe 418, as at 453. The adjusting spring 451 normally exerts a force on the operating lever 447 and upon the adjusting lever 443 to rotate these levers in a clockwise direction about the pivot pin 445. The force exerted by the spring 451 will move the adjusting lever 443 to a cocked position upon reverse brake application so that adjustmennt may be effected either upon retraction of the brake shoe 418 or upon its next actuation in the forward direction, as will become more apparent as this description proceeds.

A link 454 has one of its ends received in an aperture 455 formed in the operating lever 447 to pivotally connect the one end of the link 454 to this lever. The opposite end of the link 454 is affixed to a cage member 456 having a central opening 457. A coil compression spring 458 is received in the opening 457 and abuttingly engages the upper end of the cage member 456. The opposite end of the spring 458 is in engagement with an enlarged head portion 459 of a rod 461 that extends concentrically through the spring 458 and which is supported for sliding movement in a boss 462 of the cage member 456. The upper end of the rod 461 is received in an aperture 463 formed in a lever 464 to pivotally connect the rod 461 to the lever 464. The lever 464 is pivotally supported upon the brake shoe web 417, as by a bolt or pivot pin 465. The lever 464 has an abutment surface 466 that is juxtaposed to the abutment surface 428 of the backing plate 412.

As has been noted, the automatic adjusting device of this embodiment cocks on reverse application of the brake shoe 418 and for this reason the operation of the brake 411 upon reverse application will be described first. Assuming the associated brake drum to be rotating in the direction of the arrow 471, which is the opposite to its normal direction of rotation, actuation of the wheel cylinders 413 and 414 will force the brake shoe 418 outwardly. This outward movement continues until the lining 419 engages the drum and thereafter the shoe 418 will tend to rotate with the drum in the direction of the arrow 471. This rotation will continue until the stop member abutment surface 441 engages the abutment surface 431 of the backing plate 412. At this time, the abutment surface 427 at the opposite end of the web 417 will have moved away from the backing plate abutment surface 428 an amount determined by the wear of the lining 419. Assuming that sufficient lining wear has taken place to require adjustment, the lever 464 will pivot in a clockwise direction under the influence of the adjusting spring 451 the force of which is transmitted to this lever by the operating lever 447, the link 454, spring 458 and rod 461. The degree of pivotal movement of the lever 464 will be dependent upon the degree of lining wear and movement will continue until its abutment surface 466 again engages the backing plate abutment surface 428. Upon this pivotal movement, the actuating lever 447 and adjusting lever 443 will pivot in a clockwise direction so that the adjusting lever end 446 is positioned to engage the next tooth of the star wheel 437. In other words, the adjusting lever 443 is cocked during this operation.

Upon release of the brake shoe 418 and its return to its retracted position (FIG. 8) by the return springs 421 and 422, the lever 464 will be pivoted in a counterclockwise direction relative to the web 417. This movement will be transmitted through the rod 461 and spring 458 to the link 454 if the resistance to turning movement of the star wheel 437 and internally threaded sleeve 438 does not exceed the preload on the spring 458. If the spring 458 does not yield, the actuating lever 447 and adjusting lever 443 will pivot in a counterclockwise direction and effect rotary movement of the star wheel 437 and accordingly adjustment of the brake.

If the resistance to turning movement is greater than the preload of the spring 458, however, adjustment will not be effected at this time and the spring 438 will only be further compressed. This action may occur when the shoe 418 is in its retracted position and the return springs 421 and 422 exert sufficient force upon the stop member 439. Assuming that, for this reason, the adjustment cannot be effected, the adjustment will be made upon the next forward application of the brake shoe 418. At this time, the shoe 418 will rotate with the brake drum in a direction opposite to that indicated by the arrow 471 and the stop member abutment surface 441 will be moved away from the backing plate abutment surface 412. A substantial amount of resistance to the turning movement of the star wheel 437 will be relieved and the spring 458 will relieve its compression to exert a force on the link 454. Counterclockwise pivotal movement of the actuating lever 447 and the adjusting lever 443 will then occur to effect the adjustment.

While it will be apparent that the preferred embodiments of the invention disclosed are well calculated to fulfill the objects above stated, it will be appreciated that the invention is susceptible to modification, variation and change.

What is claimed is:

1. An automatically adjustable internal shoe brake comprising a brake shoe having a web and a frictional lining carried thereby, a wheel cylinder juxtaposed to one end of said web, said wheel cylinder including a hydraulically actuated plunger operatively associated with said one end of said web for urging said frictional lining into engagement with an associated brake drum, a first abutment member fixed relative to said wheel cylinder and juxtaposed to said one end of said web, said web having an abutment surface adapted to abuttingly engage said first abutment member, a second abutment member juxtaposed to the other end of said web, automatically adjustable extensible means carried by said other end of said web, said extensible means including a rotatable member adapted to increase the length of said extensible means upon rotation of said rotatable member and a stop member having an abutment surface adapted to abuttingly engage said second abutment member, an adjusting lever supported for pivotal movement relative to said web and having an end portion adapted to engage said rotatable member to rotate said member and lengthen said extensible means upon pivotal movement of said adjusting lever, and means responsive to a predetermined degree of movement of said one end of said web relative to said first abutment member for pivoting said adjusting lever.

2. An automatically adjustable internal shoe brake as set forth in claim 1 wherein the adjusting lever is supported for pivotal movement between a cocked position and an adjusting position for rotating the rotatable member, the last named means being effective to pivot said adjusting lever from its cocked position to its adjusting position upon a predetermined degree of movement of the one end of the web away from the first abutment member.

3. An automatically adjustable internal shoe brake as set forth in claim 2 wherein the last named means includes linkage means operatively interconnecting the first abutment member to the adjusting lever.

4. An automatically adjustable internal shoe brake as set forth in claim 3 wherein the linkage means includes spring means, said spring means being effective to yield for allowing relative movement in the linkage means if the resistance to turning movement of the rotatable member exceeds a predetermined value.

5. An automatically adjustable internal shoe brake as set forth in claim 2 wherein the last named means includes a flexible transmitter operatively connected at one of its ends to the first abutment member and operatively connected at its other end to the adjusting lever, one of said operative connections including spring means for yielding upon a predetermined degree of resistance of the rotatable member to rotation.

6. An automatically adjustable internal shoe brake as set forth in claim 1 wherein the adjusting lever is supported for pivotal movement between a cocked position and an adjusting position for rotating the rotatable member, the last named means being effective to move said adjusting lever from its adjusting position to its cocked position upon a predetermined degree of movement of the one end of the web away from the first abutment member, and further including adjusting spring means for moving said adjusting lever from its cocked position to its adjusting position upon the movement of said one end of said web toward said first abutment member.

7. An automatically adjustable internal shoe brake as set forth in claim 6 wherein the means for moving the adjusting lever from its adjusting position to its cocked position comprises linkage means operatively connecting said adjusting lever to the first abutment member.

8. An automatically adustable internal shoe brake as set forth in claim 7 wherein the linkage means further includes biasing spring means for permitting movement of the one end of the web toward the first abutment member without effecting movement of said adjusting lever from its cocked position to its adjusting position if the resistance to turning of the rotatable member exceeds a predetermined value.

9. An automatically adjustable internal shoe brake as set forth in claim 1 wherein the adjusting lever is pivotally supported upon the extensible means.

10. An automatically adjustable internal shoe brake as set forth in claim 9 wherein the extensible means comprises a block having a slot for receiving a portion of the web of the brake shoe, said web being affixed to said block, said block defining an internal bore, the rotatable member comprising an internally threaded sleeve rotatably supported in said bore, a star wheel affixed to said internally threaded sleeve and adapted to be rotated by the adjusting lever, the stop member having a male threaded shank received in said internally threaded sleeve, said stop member having a slotted portion receiving a portion of said web for affixing said stop member against rotation.

11. An automatically adjustable internal shoe brake comprising a brake shoe having a web and a frictional lining carried thereby, a first wheel cylinder juxtaposed to one end of said web, a second wheel cylinder juxtaposed to the other end of said web, each of said wheel cylinders including a hydraulically actuated plunger operatively associated with the respective end of said web for urging said frictional lining into engagement with an associated brake drum, a first abutment member fixed relative to said first wheel cylinder and juxtaposed to one end of said web, said web having an abutment surface adapted to abuttingly engage said first abutment member, a second abutment member juxtaposed to the other end of said web and to said second wheel cylinder, an automatically adjustable extensible member carried by said other end of said web, said extensible member comprising a block affixed to said other end of said web, a bore formed in said block, an internaly threaded sleeve rotatably supported in said bore, said internally threaded sleeve having a star wheel formed at one end thereof juxtaposed to said block and a stop member threadingly received in said internally threaded sleeve, said stop member having an abutment surface adapted to abuttingly engage said second abutment member, said stop member further having a slot receiving a portion of said opposite end of said web for holding said stop member against rotation relative to said web, an adjusting lever supported for pivotal movement relative to said web and having an end portion adapted to engage said star wheel for rotating said star wheel and said internally threaded sleeve upon pivotal movement of said adjusting lever, and means for pivoting said adjusting lever upon a predetermined degree of movement of said one end of said web relative to said first abutment member.

12. An automatically adjustable internal shoe brake as set forth in claim 11 wherein the adjusting lever is supported for pivotal movement upon the block between a cocked position and an adjusting position, the last named means comprising a first link pivotally connected at one of its ends to said adjusting lever, a bellcrank pivotally supported upon the web, the other end of said first link being pivotally connected to said bellcrank, a second link pivotally connected at one of its ends to said bellcrank, means for affixing the other end of said second link to said first abutment member for pivoting said bellcrank and for pivoting said adjusting lever from its adjusting position to its cocked position upon movement of the one end of the web relative to said first abutment member an amount greater than a predetermined amount, and further including adjusting spring means for pivoting said adjusting lever from its cocked position to its adjusting position upon movement of the stop member away from the second abutment member.

13. An automatically adjustable internal shoe brake as set forth in claim 11 wherein the adjusting lever is pivotally supported upon the block for movement between a cocked position and an adjusting position, the last named means comprising a flexible cable fixed at one end to one end of said adjusting lever, a pulley carried by the web, said flexible cable being engaged with said pulley intermediate its ends, an anchor member fixed to the other end of said flexible cable, a rod affixed at one end thereof to the first abutment member and slidably supported by said anchor member, spring means interposed between said rod and said anchor member for tensioning said flexible cable upon movement of said one end of said web relative to said first abutment member for pivoting said adjusting lever from its cocked position to its adjusting position for rotating the star wheel upon a predetermined degree of wear of the lining and until the force required to turn said star wheel exceeds the preload upon said spring means, and return spring means interposed between said brake shoe and said adjusting lever for pivoting said adjusting lever from its adjusting position to its cocked position upon movement of said brake shoe to its released position.

14. An automatically adjustable internal shoe brake as set forth in claim 11 wherein the adjusting lever is pivotally supported upon the block for movement between a cocked position and an adjusting position and having an end portion adapted to engage the star wheel for rotating said star wheel and the internally threaded sleeve upon pivotal movement of said adjusting lever from its cocked position to its adjusting position, the last named means comprising a link pivotally connected at one of its ends to said adjusting lever, a bellcrank pivotally supported by the web, the opposite end of said link being pivotally connected to said bellcrank, a tension spring connected between said bellcrank and the first abutment member for pivoting said bellcrank and said adjusting lever from its cocked position to its adjusting position upon movement of said one end of said web away from said first abutment member, and a rigid member supported for sliding movement by said web and interposed between said bellcrank and said first abutment member for precluding pivotal movement of said bellcrank under the action of said spring when said brake shoe is in its retracted position.

15. An automatically adjustable internal shoe brake as set forth in claim 11 wherein the adjusting lever is pivotally supported upon the web for movement between a cocked position and an adjusting position, said adjusting lever having a first portion adapted to engage the star wheel for rotating said star wheel upon pivotal movement of said adjusting lever from its cocked position to its released position, the last named means comprising first spring means interposed between the brake shoe and said adjusting lever for pivoting said adjusting lever toward its cocked position, a first U-shaped member having its bight engaged with the other end of said adjusting lever, a second U-shaped member having its bight affixed relative to the first abutment member, second spring means interposed between said U-shaped members for urging said other end of said adjusting lever into engagement with the outer ends of the legs of said second U-shaped member and for effecting pivotal movement of said adjusting lever from its cocked position to its adjusting position upon movement of said abutment surface of said web relative to said first abutment member.

16. An automatically adjustable internal shoe brake as set forth in claim 11 wherein the adjusting lever is pivotally supported upon the block for movement between a cocked position and a released position and having an end portion adapted to engage the star wheel for rotating said star wheel and said internally threaded sleeve upon pivotal movement of said adjusting lever from its cocked position to its adjusting position, the last named means comprising a first link pivotally connected at one end thereof to said adjustment lever, a lever pivotally supported upon the web, said lever having an abutment surface adapted to engage the first abutment member, a second link pivotally connected to said lever, first spring means interposed between said links for transmitting pivotal movement of said lever into pivotal movement of said adjusting lever from its cocked position to its adjusting position upon movement of said one end of said web toward said first abutment member, and adjusting spring means acting between said brake shoe and said adjusting lever for pivoting said adjusting lever to its cocked position upon a predetermined degree of movement of said abutment surface of said web away from said first abutment member and for pivoting said link to bring its abutment surface into engagement with said first abutment member.

17. An automatic adjusting device for an internal shoe type brake comprising a block, said block being slotted at one end thereof for receipt of a portion of the web of an associated brake shoe, a bore extending into said block from the other end thereof, an internally threaded sleeve rotatably supported within said bore, a star wheel integrally formed at one end of said sleeve and abuttingly engaged with said other end of said block, and a stop member having a male threaded shank received in said internally threaded sleeve, said stop member providing an abutment surface juxtaposed to said star wheel and adapted to engage an associated brake component, said stop member further having a slot formed in one end thereof adapted to receive a portion of the web of the associated brake shoe for holding said stop member against rotation.

18. An automatic adjusting device as set forth in claim 17 further including an adjusting lever having an end portion adapted to engage the star wheel for rotating the star wheel and associated internally threaded sleeve, and pivot pin means affixed to said block for pivotally supporting said adjusting lever.

References Cited

UNITED STATES PATENTS 3,216,533 11/1965 Hagerty et al.

FOREIGN PATENTS 1,428,793 1/1966 France.

DUANE A. REGER, Primary Examiner

U.S. Cl. X.R.

188—196

PO-1050
(5/69)

UNITED STATES PATENT OFFICE
CERTIFICATE OF CORRECTION

Patent No. 3,526,301        Dated September 1, 1970

Inventor(s) David T. Ayers, Jr.

It is certified that error appears in the above-identified patent and that said Letters Patent are hereby corrected as shown below:

Column 3, line 23, "47" should read -- 57 --.

Column 4, line 39, delete "tension on the link 68 is transmitted to the actuating".

Column 4, line 40, "evert" should read -- exert --.

Column 4, line 45 "alsos" should read -- also --.

Column 7, line 14, "details" should read -- detail --.

Column 7, line 70, after "243." insert -- is formed with a cam end portion 245 that is adapted to engage the star wheel 238 and to rotate the star wheel 238 upon pivotal movement of the adjusting lever 243.

Column 7, line 70, delete "An operating lever 246 is also supported upon".

Column 7, lines 71, 72 and 73, delete "adapted to engage the star wheel 238 and to rotate the star wheel 238 upon pivotal movement of the adjusting lever 243."

Column 7, line 73, "noperating" should read -- operating --.

Column 10, line 61, "adjsuting" should read -- adjusting --.

SIGNED AND
SEALED
NOV 17 1970

(SEAL)
Attest:

Edward M. Fletcher, Jr.
Attesting Officer

WILLIAM E. SCHUYLER, JR.
Commissioner of Patents